(12) United States Patent
Yen et al.

(10) Patent No.: US 8,523,774 B2
(45) Date of Patent: Sep. 3, 2013

(54) FRESNEL-BASED BEAMFORMING FOR ULTRASONIC ARRAYS

(75) Inventors: Jesse Yen, La Crescenta, CA (US); Jay Mung, Los Angeles, CA (US); Man Nguyen, San Diego, CA (US)

(73) Assignee: University of Southern California, Los Angeles, CA (US)

( * ) Notice: Subject to any disclaimer, the term of this patent is extended or adjusted under 35 U.S.C. 154(b) by 341 days.

(21) Appl. No.: 12/875,865

(22) Filed: Sep. 3, 2010

(65) Prior Publication Data
US 2011/0060226 A1 Mar. 10, 2011

Related U.S. Application Data

(60) Provisional application No. 61/240,122, filed on Sep. 4, 2009.

(51) Int. Cl.
*A61B 8/00* (2006.01)
(52) U.S. Cl.
USPC ............ 600/437; 600/443; 600/446; 600/472
(58) Field of Classification Search
USPC .......................................... 600/443, 446, 472
See application file for complete search history.

(56) References Cited

U.S. PATENT DOCUMENTS

| | | |
|---|---|---|
| 3,911,730 A | 10/1975 | Niklas |
| 4,117,446 A | 9/1978 | Alais |
| 4,161,121 A | 7/1979 | Zitelli et al. |
| 4,228,686 A | 10/1980 | Tancrell |
| 4,320,660 A | 3/1982 | Tancrell |
| 4,351,038 A | 9/1982 | Alais |
| 4,481,823 A | 11/1984 | Alais |
| 4,699,009 A | 10/1987 | Maslak et al. |
| 4,890,267 A * | 12/1989 | Rudolph ...................... 367/103 |
| 4,983,970 A | 1/1991 | O'Donnell et al. |
| 5,676,147 A | 10/1997 | Petrofsky et al. |
| 5,722,412 A | 3/1998 | Pflugrath et al. |
| 5,964,709 A | 10/1999 | Chiang et al. |
| 6,013,032 A | 1/2000 | Savord |
| 6,106,472 A | 8/2000 | Chiang et al. |

(Continued)

OTHER PUBLICATIONS

Richard, B. et al. 1980. New arrangements for Fresnel focusing, Acoustical Imaging, vol. 9, K. Wang, Ed., New York: Plenum Press, 1980, pp. 65-73.

(Continued)

*Primary Examiner* — James Kish
*Assistant Examiner* — Christopher Cook
(74) *Attorney, Agent, or Firm* — McDermott Will & Emery LLP

(57) ABSTRACT

An ultrasonic beamformer may include an input signal line for each ultrasonic transducer element configured to carry a broadband pulse from the ultrasonic element. The ultrasonic beamformer may include a number of signal shifters that is substantially less than the number of transducer elements. Each signal shifter may be configured to shift a broadband pulse in a way that is different from the way the other signal shifters are configured to shift a broadband pulse. For each of the input signal lines, a multiplexer may be configured to electrically connect the broadband pulse received on the input signal line to a selected one of the signal shifters. A multiplexer controller may be configured to generate the control signal for each of the multiplexers in a fashion that causes the ultrasonic beamformer to substantially compensate for the differences in the distances. A comparable configuration may be used for transmission.

29 Claims, 14 Drawing Sheets

(56) References Cited

U.S. PATENT DOCUMENTS

| | | | |
|---|---|---|---|
| 6,475,146 B1 | 11/2002 | Frelburger et al. | |
| 7,115,093 B2 | 10/2006 | Halmann et al. | |
| 2005/0096538 A1* | 5/2005 | Chomas et al. | 600/437 |
| 2005/0124890 A1* | 6/2005 | Halmann et al. | 600/446 |
| 2005/0203391 A1* | 9/2005 | Phelps et al. | 600/437 |
| 2005/0243812 A1 | 11/2005 | Phelps | |
| 2007/0167786 A1 | 7/2007 | Lee et al. | |
| 2009/0005684 A1 | 1/2009 | Kristoffersen et al. | |
| 2009/0227872 A1* | 9/2009 | Pan et al. | 600/458 |

OTHER PUBLICATIONS

Ranganathan, K. et al. 2004. Direct sampled I/Q beamforming for compact and very low-cost ultrasound imaging, IEEE Trans. Ultrason. Ferroelectr. Freq. Control, vol. 51, No. 9, pp. 1082-1094, 2004.

International Search Report and Written Opinion of the International Searching Authority, mailed Mar. 31, 2011, for PCT Application No. PCT/US2010/047882, filed Sep. 3, 2010.

Pesque, P. et al. 1999. Digital ultrasound: from beamforming to PACS. MedicaMundi, vol. 43, No. 3, Sep. 1999, pp. 7-10.

* cited by examiner

FRESNEL-BASED BEAMFORMING FOR ULTRASONIC ARRAYS

CROSS-REFERENCE TO RELATED APPLICATION[S]

This application is based upon and claims priority to U.S. provisional patent application 61/240,122, entitled "MINIATURIZED ULTRASOUND IMAGING SYSTEM," filed Sep. 4, 2009. The entire content of this application is incorporated herein by reference.

BACKGROUND

1. Technical Field

This application relates to beamforming technologies that may be used in connection with portable ultrasound systems.

2. Description of Related Art

In recent years, a segment of the ultrasound community has focused on making ultrasound systems which are smaller, cheaper, and more power-efficient, while maintaining good image quality. These hand-held systems can become "ultrasonic stethoscopes" that allow physicians to perform ultrasound examinations almost anywhere and at anytime. See J. R. T. C. Roelandt, "Ultrasound stethoscopy: A renaissance of the physical examination?," *Heart*, vol. 89, pp. 971-974, 2003; J. Hwang, J. Quistgaard, J. Souquet, and L. A. Crum, "Portable ultrasound device for battlefield trauma," *Proc. IEEE Ultrason. Symp.*, vol. 2, pp. 1663-1667, 1998; U. Rosenschein, V. Furman, E. Kerner, I Fabian, J Bernheim, and Y. Eshel, "Ultrasound imaging-guided noninvasive ultrasound thrombolysis: preclinical results," *Circulation*, vol. 102, no. 2, pp. 238-45, 2000.

For example, a hand-held system can provide point-of-care diagnosis in remote locations, battlefields, emergency rooms, and private clinics. It can also be used in trauma or minimally invasive ultrasound-guided procedures, such as central catheter insertion. See J. Hwang, J. Quistgaard, J. Souquet, and L. A. Crum, "Portable ultrasound device for battlefield trauma," *Proc. IEEE Ultrason. Symp.*, vol. 2, pp. 1663-1667, 1998; U. Rosenschein, V. Furman, E. Kerner, I Fabian, J Bernheim, and Y. Eshel, "Ultrasound imaging-guided noninvasive ultrasound thrombolysis: preclinical results," *Circulation*, vol. 102, no. 2, pp. 238-45, 2000. With wide-ranging applications in clinics, developing countries, and the military, the demand for portable ultrasound systems has increased rapidly in the last decade. The P10 from Siemens and the VSCAN from GE Healthcare are examples of recently introduced pocket-size ultrasound systems.

There have been many approaches to improving the size, cost, and quality of portable ultrasound systems. These include improvements in transducer design, transmit and receive circuitry design, and beamforming algorithms.

A significant percentage of the size and power of an ultrasound system can be devoted to the beamformer, which can be responsible for focusing the ultrasound beam both during transmit and receive operations. One standard beamformer consists of 64 to 128 transmit/receive channels. However, these can require expensive and bulky beamformers.

Beamforming

Beamforming approaches can be broadly categorized into two methods: analog beamforming and digital beamforming. In analog beamforming, the images may be formed by a sequence of analog signals which are delayed with analog delay lines, summed in the analog domain, and then digitized. In digital beamforming, the images may be formed by sampling analog signals from individual array elements, applying digital delays, and then summing digitally. See B. D. Steinberg, "Digital beamforming in ultrasound," *IEEE Trans. Ultrason., Ferroelectr., Freq. Control*, vol. 39, no. 6, pp. 716-721, 1992.

Digital beamforming may apply time delays to focus digitized data (traditional delay-and-sum beamforming (DAS)) or may combine digital time delays with complex phase rotation. See M. O'Donnell, W. E. Engeler, J. J. Bloomer, and J. T. Pedicone, "Method and apparatus for digital phase array imaging," U.S. Pat. No. 4,983,970, 1991; A. Agarwal, F. K. Schneider, Y. M. Yoo, and Y. Kim, "Image quality evaluation with a new phase rotation beamformer," *IEEE Trans. Ultrason., Ferroelectr., Freq. Control*, vol. 55, no. 9, pp. 1947-1955, 2008. In digital DAS beamforming, the focused data may be summed and passed on for envelope detection and further signal processing. This method may be straightforward and intuitive, but may require a significant amount of hardware and processing capability.

Digital beamforming may also be achieved by digitizing the incoming RF data from each element, but then applying a coarse delay, followed by complex demodulation with phase rotation for fine delay. This method may reduce the computational demands compared to DAS beamforming, but may still require redundant hardware for each channel. See M. O'Donnell, W. E. Engeler, J. T. Pedicone, A. M. Itani, S. E. Noujaim, R. J. Dunki-Jacobs, W. M. Leue, C. L. Chalek, L. S. Smith, J. E. Piel, R. L. Harris, K. B. Welles, and W. L. Hinrichs, "Real-time phased array imaging using digital beam forming and autonomous channel control," *Proc. IEEE Ultrason. Symp.*, 1990, pp. 1499-1502.

A hybrid approach to beamforming may also be possible where different parts of the beamforming process occur in either analog or digital domains. In one case, echoes from clusters of elements may be delayed and summed in the analog domain and then digitized by a single analog-to-digital (A/D) converter. This approach may reduce the number of A/D converters compared to a full digital beamformer. See P. Pesque and J. Bouquet, "Digital ultrasound: from beamforming to PACS," *MedicaMundi*, vol. 43, issue 3, pp 7-10, 1999.

To minimize the cost, power, and size of the beamformer, low-cost beamforming approaches have been proposed in the literature. One concept is the direct-sampled I/O (DSIQ) beamforming algorithm in which I/O data may be acquired by directly sampling the Q data one quarter-period after the I data. See K. Ranganathan and W. F. Walker, "Direct sampled I/O beamforming for compact and very low-cost ultrasound imaging," *IEEE Trans. Ultrason., Ferroelect., Freq. Control*, vol. 51, no. 9, pp. 1082-1094, 2004. The DSIQ algorithm may rely solely on phase rotation of the I/O data to provide focusing. The proposed realization may use only one transmitter with a lower sampling rate and one I/O channel for each element. When used with a 2-D array, the DSIQ method may acquire C-scan images at 43 frames per second, B-scans with arbitrary plane orientation, and 3D images. See M. Fuller, K. Owen, T. Blalock, J. Hossack, W. Walker, "Real-time imaging with the Sonic Window: A pocket-sized, C-scan, medical ultrasound device," *Proc. IEEE Trans. Ultrason., Ferroelect., Freq. Control. Symp.*, 2009.

Another concept is known as Fresnel focusing. Originally used in optics, a Fresnel lens may be much thinner and therefore lighter than a conventional lens with the same focal point. In acoustics, physical Fresnel lenses were fabricated to focus ultrasonic waves for an acoustic microscopy system, which may provide high efficiency and focusing power, as well as a simpler manufacturing process. See B. Hadimioglu, E. G. Rawson, R. Lujan, M. Lim, J. C. Zesch, B. T. Khuri-Yakub, and C. F. Quate, "High-efficiency Fresnel acoustic lenses," in

*IEEE Ultrason. Symp.*, pp. 579-582, 1993, S. C. Chan, M. Mina, S. Udpa, L. Udpa, and W. Lord, "Finite Element Analysis of Multilevel Acoustic Fresnel Lenses," *IEEE Trans. Ultrason., Ferroelectr., Freq. Control*, vol. 43, no. 4, pp. 670-677, 1996. These physical lenses may replace the spherical focus of a conventional lens with an equivalent phase shift. Used with an array transducer, the Fresnel focusing technique may reduce the number of delays needed since different elements may require the same delay. These elements may then be clustered together.

In 1980, Fink first proposed the use of Fresnel focusing in an array-based system. In his experiment for 8-state Fresnel focusing, 8 different delays were used for transmit mode, while four different delays plus inverting amplifiers were used for receive mode. By imaging a 0.3 mm diameter copper wire, he showed that for a linear array, finer Fresnel phase sampling may lower the sidelobe level and the lateral resolution improves as f# decreases. See B. Richard, M. Fink, P. Alais, "New arrangements for Fresnel focusing," in *Acoustical Imaging*, vol. 9, K. Wang, Ed. New York: Plenum Press, 1980, pp. 65-73.

SUMMARY

An ultrasonic beamformer may substantially compensate for differences in distances between ultrasonic elements in an ultrasonic transducer array and a location remote from the ultrasonic transducer array from which a reflected broadband pulse is received by each of the ultrasonic elements. The ultrasonic beamformer may include an input signal line for each of the ultrasonic elements configured to carry the broadband pulse from the ultrasonic element. The ultrasonic beamformer may also include a number of signal shifters that is substantially less than the number of transducer elements. Each signal shifter may be configured to shift a broadband pulse in a way that is different from the way the other signal shifters are configured to shift a broadband pulse. For each of the input signal lines, a multiplexer may be configured to electrically connect the broadband pulse received on the input signal line to a selected one of the signal shifters. The selected one may be based on a control signal. A multiplexer controller may be configured to generate the control signal for each of the multiplexers in a fashion that causes the ultrasonic beamformer to substantially compensate for the differences in the distances.

Each of the signal shifters may be a phase shifter which is configured to provide a phase shift that differs from the phase shift provided by each of the other phase shifters by no more than 360 degrees.

The phase shifts that are provided by the phase shifters may be spaced apart by substantially equal amounts.

There may be at least four phase shifters that provide a phase shift of substantially 0, 90, 180, and 270 degrees, respectively.

The ultrasonic beamformer may include a differential amplifier configured to function as one of the phase shifters providing a substantially 0 degree phase shift, another of the phase shifters providing a substantially 180 degree phase shift, and to sum the result.

One of the phase shifters may provide a substantially 0 degree phase shift and another may provide a substantially 180 degree phase shift. The ultrasonic beamformer may include a summer configured to sum the outputs of the phase shifters and a delay element configured to delay the output of the summer by substantially a quarter period of the center frequency of the broadband pulses.

The ultrasonic beamformer may include a first summer configured to sum the output of the phase shifters which provide a substantially 0 and 180 degree phase shift, a second summer configured to sum the output of the phase shifters which provide a substantially 0 and 180 degree phase shift, and a phase shifter configured to shift the output of the second summer by 90 degrees, thereby producing the 90 and 270 degree phase shifts referred to above.

One of the summers may sum in the analog domain and the other summer may sum in the digital domain.

The phase shifters which shift by 90 and 270 degrees may each be part of a bandpass filter.

There may be at least four additional phase shifters that provide a phase shift of substantially 45, 135, 225, and 315 degrees, respectively.

There may be at least six phase shifters that provide a phase shift of substantially 0, 60, 120, 180, 240, and 300 degrees, respectively.

There may be at least six additional phase shifters that provide a phase shift of substantially 30, 90, 150, 210, 270, and 330 degrees, respectively.

At least one of the phase shifters may shift in the analog domain. At least one of the phase shifters may shift in the digital domain.

The number of signal shifters may be no more than ¼ the number of ultrasonic elements.

The ultrasonic beamformer may include a number of analog-to-digital converters that is no more than ⅛ the number of ultrasonic elements. Each may be configured to convert one of the broadband pulses from analog to digital format.

The ultrasonic beamformer may cause a transmitting ultrasonic transducer array having an array of transmitting ultrasonic elements to deliver an ultrasonic beam substantially focused at the location remote from the transmitting ultrasonic transducer array. The ultrasonic beamformer may include an output signal line for each of the transmitting ultrasonic elements configured to carry a broadband pulse to the transmitting ultrasonic element and a number of pulse transmitters that is substantially less than the number of transmitting ultrasonic elements. Each pulse transmitter may be configured to generate a broadband pulse different from the broadband pulse generated by each of the other pulse transmitters. For each of the output signal lines, a transmitting multiplexer may be configured to electrically connect the output signal line to the broadband pulse that is generated by a selected one of the pulse transmitters. The selected one may be based on a control signal. A transmitting multiplexer controller may be configured to generate the control signal for each of the transmitting multiplexers in a fashion that causes an ultrasonic beam to be substantially focused at the location remote from the ultrasonic transducer array.

The broadband pulses that are generated by the pulse transmitters may have substantially the same center frequency and may be separated in time from each other by no more than the period of the center frequency.

The broadband pulses that are generated by the pulse transmitters may be shifted in phase with respect to one another.

The number of pulse transmitters may be no more than ⅛ the number of transmitting ultrasonic elements.

The receiving ultrasonic transducer array, the receiving ultrasonic elements, and the input signal lines may, respectively, be the same as the transmitting ultrasonic transducer array, the transmitting ultrasonic elements, and the output signal lines.

The number of signal shifters may be the same as the number of pulse transmitters.

The signal shifters, the multiplexers, and the multiplex controller may collectively comprise a first module of the ultrasonic beamformer. The ultrasonic beamformer may include one or more additional modules. Each additional module may also contain signal shifters, multiplexers, and a multiplex controller as described above, but otherwise being different from the first module and each of the other modules. Each additional module may be configured to deliver an output which is delayed in time from the output of the first module by an integer multiple of the period of the center frequency of the broadband pulses. The integer multiple for each additional module may be different from the integer multiple for the other additional modules. A summer may be configured to sum the outputs of each of the modules.

The pulse transmitters, the multiplexers, and the multiplex controller may collectively comprise a first module of the ultrasonic beamformer. The ultrasonic beamformer may include one or more additional modules. Each additional module may also contain pulse transmitters, multiplexers, and a multiplex controller as described above, but otherwise being different from the first module and each of the other modules. Each may be configured to deliver an output which is delayed in time from an output of the first module by an integer multiple of the period of the center frequency of the broadband pulses. The integer multiple for each additional module may be different from the integer multiple for the other additional modules.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings disclose illustrative embodiments. They do not set forth all embodiments. Other embodiments may be used in addition or instead. Details which may be apparent or unnecessary may be omitted to save space or for more effective illustration. Conversely, some embodiments may be practiced without all of the details which are disclosed. When the same numeral appears in different drawings, it refers to the same or like components or steps.

DETAILED DESCRIPTION OF ILLUSTRATIVE EMBODIMENTS

Figure 1:
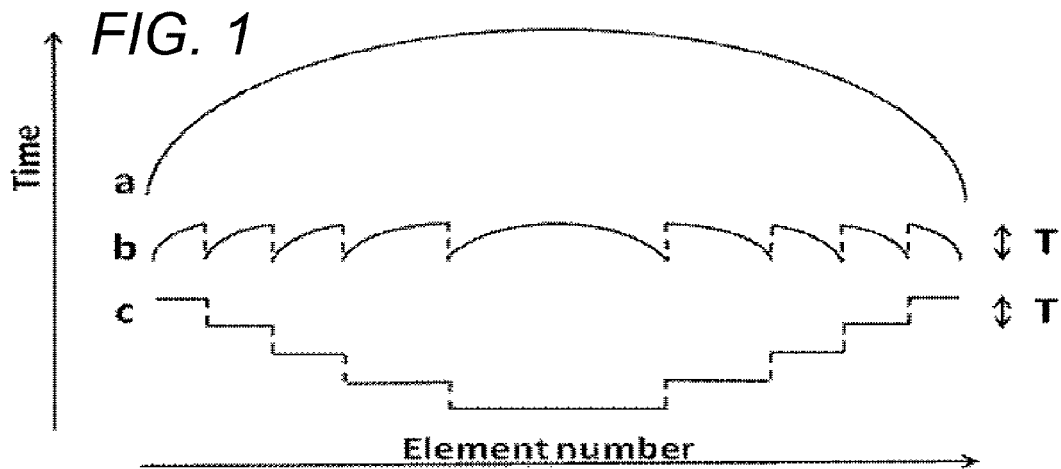
FIG. 1 illustrates delay profiles (not to scale) when different beamforming technologies are used.

Illustrative embodiments are now discussed. Other embodiments may be used in addition or instead. Details which may be apparent or unnecessary may be omitted to save space or for a more effective presentation. Conversely, some embodiments may be practiced without all of the details which are disclosed.

Modified, electronic, Fresnel-based beamforming technology is now described. The approaches may include a combination of analog and digital beamforming techniques.

The discussion includes two versions of Fresnel beamforming: a 4-phase (4 different time delays or phase shifts) and an 8-phase (8 different time delays or phase shifts). These are merely illustrative. Using this technology, a system with 4 to 8 transmit channels and 2 receive channels with a network of switches may be used to focus an array with 64 to 128 or even more elements. A different number of phases and channels may be used instead.

The simulation and experimental results suggest that Fresnel beamforming image quality may be comparable to traditional delay-and-sum (DAS) beamforming in terms of spatial resolution and contrast-to-noise ratio (CNR) under certain system parameters. At f#=2 and 50% signal bandwidth, for example, experimental lateral beamwidths were 0.48, 0.52, and 0.50 mm, and the axial pulse lengths were 0.51, 0.60, and 0.58 mm for DAS, 8-phase, and 4-phase Fresnel beamforming, respectively. The experimental CNRs were 4.66, 4.42, and 3.98, respectively. These experimental results are in good agreement with simulation results.

Hybrid Fresnel Beamforming

A hybrid beamforming approach to Fresnel-based beamforming is described herein. In transmit mode, time delays may be applied to transmit elements. Elements requiring the same time delay may be clustered together using a network of switches. For example, a system may have either 4 or 8 transmit channels. In receive mode, phase shifts may be applied using a combination of the analog and digital domains. Up to 8 different phase shifts may be provided using only 2 A/D converters.

With Fresnel focusing, the standard geometric time delay $\Delta t$ may be replaced by a new delay $\Delta t_F$ given by:

$$\Delta t_F = \Delta t \bmod T$$

where mod indicates the modulo operation and T is the period of the ultrasound signal based on the center frequency. $\Delta t_F$ is the remainder after integer multiples of the ultrasound period T have been subtracted from Δt.

FIG. 1 illustrates delay profiles (not to scale) when different beamforming technologies are used. Profile A is for DAS geometric focus beamforming; profile B is for Fresnel beamforming; and profile C is the difference between DAS and Fresnel beamforming. Each segment corresponds to one period of the signal. Profile B is after integer multiples of the period have been subtracted. Profile B may have a shape similar to a physical Fresnel lens. Each segment in profile B may correspond to a period T or a 360° phase offset. Using $\Delta t_F$ may result in a focusing error where the error is always an integer multiple of T. Elements which are further away from the focus may have greater focal errors. These focal errors may result in larger beamwidths, higher clutter, and longer pulse lengths.

Figure 2:
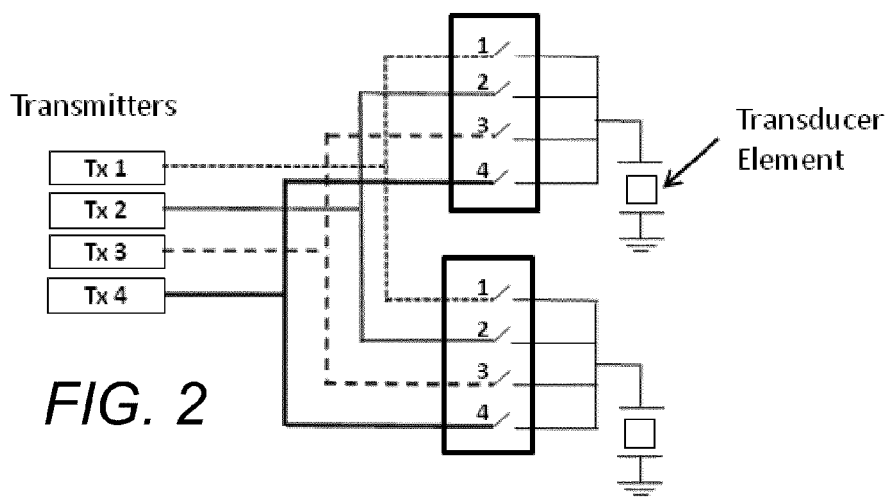
FIG. 2 illustrates a 4-transmit Fresnel (shift and sum) beamforming system for a 2-element array.

FIG. 2 illustrates a 4-transmit Fresnel (phase and sum) beamforming system for a 2-element array. In the case of a 4-transmit system, excitation signals can be generated by 4 transmitters with different time delays corresponding to quarter-period shifts up to one full period. Using 4 switches per element, the time delay of the signal emitted by each element may be controlled.

For an 8-transmit system, 8 transmitters may be used to generate signals with 8 different time delays in increments of one-eighth of a period.

On the receive side, incoming RF data may be subject to phase shifts which may also be selected based on the principle of Fresnel focusing. In narrowband applications, the time delay Δt associated with each element may be replaced with an equivalent phase shift θ that ranges from 0° to 360° based on the following relationship:

$$\theta = -\omega * \Delta t$$

where ω is the angular frequency. The delay profile may be converted into discrete phase shifts and may never exceeds 360°. When a phase shift greater than 360° is required, the phase shift may wrap around and start back at 0°.

Figure 3:
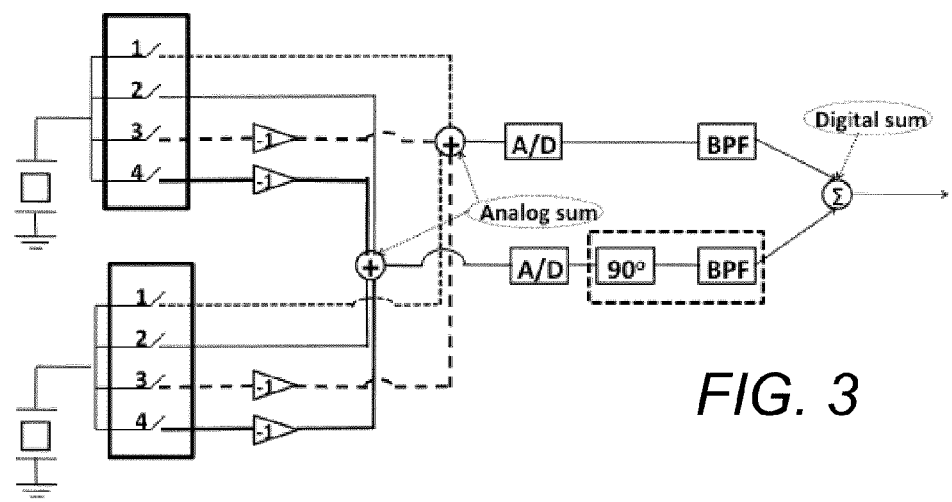
FIG. 3 illustrates a Fresnel (phase and sum) beamforming system for a 2-element array.

FIG. 3 illustrates a Fresnel (phase and sum) beamforming system for a 2-element array. As shown in FIG. 3, the phase delays in a 4-phase system may be applied to the received signals using 4 switches per element. A 0° phase shift may be applied by closing switch 1; a 45° phase shift may be applied by closing switches 1 and 2; and a 90° phase shift may be applied by closing switch 2. Inverting amplifiers may be used with switches 3 and 4 to obtain 180° and 270° phase shifts, respectively. The signals may go through two receiving channels, each of which may have an A/D converter and a digital band pass filter (BPF), as illustrated in FIG. 3. Thus, signals with phase shifts of 0°, 90°, 180°, 270° may correspond to switches 1, 2, 3, and 4, respectively.

In a 4-phase system, only one of the four switches may be closed. A 180° phase shift may be accomplished using an inverting amplifier. All 0° and 180° phase-shifted data across all elements may be summed with one summer and all 90° and 270° phase-shifted data across all elements may be summed with a second summer. These summations may be performed in the analog domain. The resultant waveforms may then be digitized by only 2 analog-to-digital (A/D) converters. The data from the second A/D converter may be phase-shifted 90° via a digital Hilbert transform, and the resultant data may be summed digitally. This phase shift can be incorporated into the coefficients of a digital finite impulse response (FIR) band-pass filter.

Instead of a using a 90° phase shift, a time delay of one-quarter period (where the period is the inverse of the transducer center frequency) may be used. This may be more convenient if one-quarter of the period is equal to an integer multiple of clock cycles.

Figure 4:
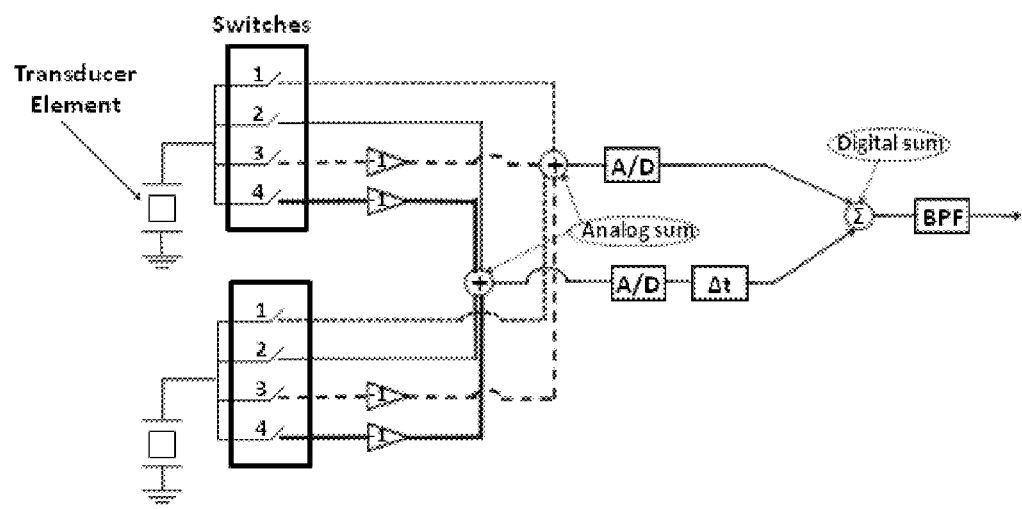
FIG. 4 illustrates a modified Fresnel beamforming system using a digital time delay.

FIG. 4 illustrates a modified Fresnel beamforming system using a digital time delay Δ=¼ period.

As another variation, the function of inverting amplifier and summer may be combined into one amplifier by using a differential amplifier. In this variation, the output of switch 1) (0° may be connected to the positive terminal of a differential amplifier, and the output of switch 3) (180° may be connected to the negative terminal. The output of switch 2) (90° may be connected to the positive terminal of a second differential amplifier and the output of switch 4) (270° may be connected to the negative terminal of a second differential amplifier.

Figure 5:
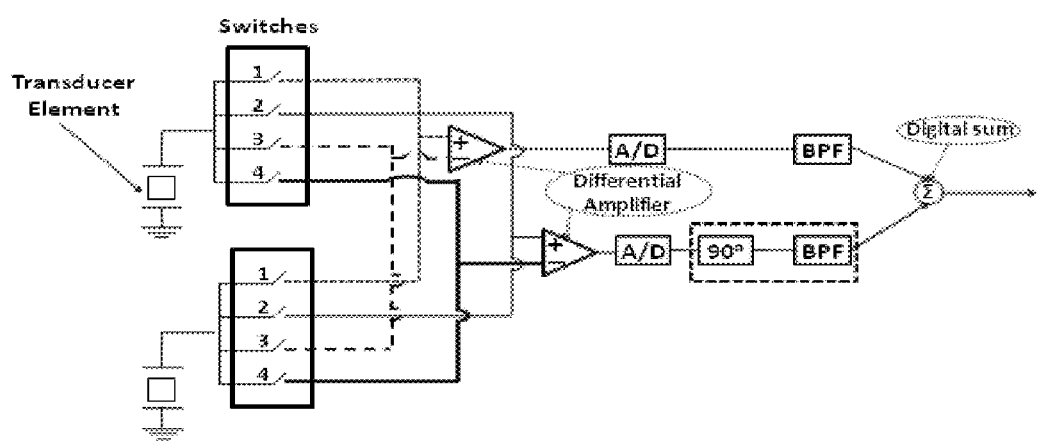
FIG. 5 illustrates Fresnel (phase and sum) beamforming using differential amplifiers.

FIG. 5 illustrates Fresnel (phase and sum) beamforming using differential amplifiers. As illustrated in FIG. 5, finer phase shifts may be achieved by selectively summing combinations of two phase-shifted signals. For example, an element requiring a 45° phase shift may achieved by applying both 0° and 90° phase shifts, followed by summation. In this case, switches 1 and 2 may be closed simultaneously. As another example, closing switches 2 and 3 may result in a 135° phase shift. Applying phase shifts in this manner may also increase the signal magnitude by a factor of $\sqrt{2}$ or 3 dB.

FIGS. 6A-F illustrates coefficients of two band-pass filters (BPF). The coefficients of a Digital Filter 1 are shown in the left column; the coefficients of a Digital Filter 2 are shown in the right column. The top row shows the coefficients of the filters in the discrete time domain; the middle row shows the magnitude response verses frequency; and the bottom row shows the phase response verses frequency. Digital Filter 1 may have a bandpass range of 2.5-7.5 MHz. Digital Filter 2 may also have essentially the same magnitude response as Digital Filter 1, but Digital Filter 2 may have a different phase response. Digital Filter 2 may incorporate a 90° phase shift. As illustrated by the second row, the magnitude responses of both filters may be the same. The third row illustrates that there may be a 90° phase shift within the passband of Filter 2 as compared to the Filter 1.

A system with 4 to 8 transmit channels and 2 receive channels may therefore be used to focus an array with as many as 128 elements. Each channel may be assigned a different time delay (transmit) or phase shift (receive). Single-pole/single-throw switches can be used to cluster elements with identical time delays and phase shifts. However, while ultrasound signals are broadband, the Fresnel receive beamformer may make a narrowband assumption about the signal, which may limit the beamformer performance. Undesirable sidelobe levels and large mainlobe widths may be potential problems. Simulations and experiments have been performed to quantify and evaluate performance.

Figure 7:
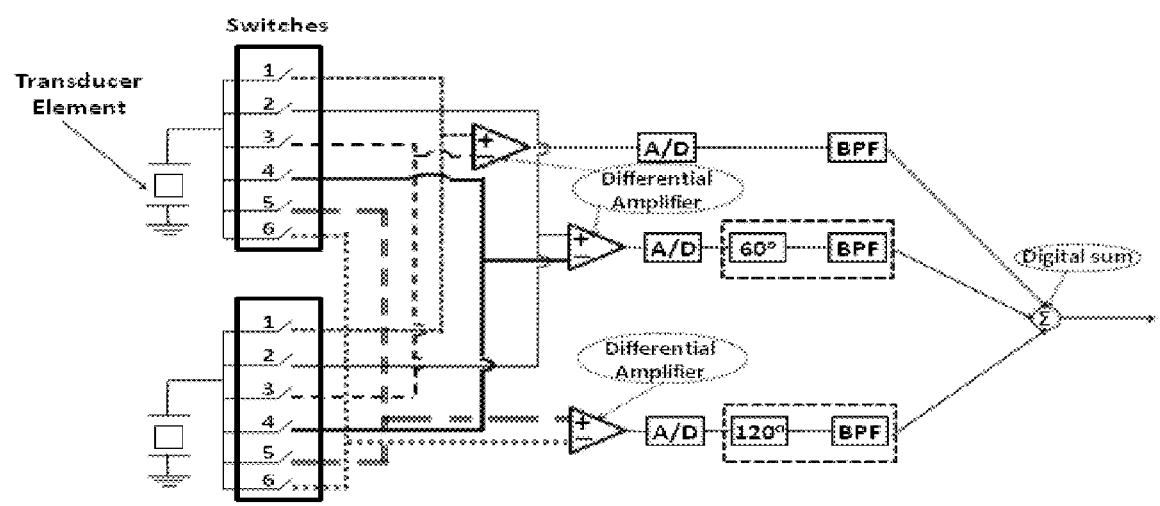
FIG. 7 illustrates a Fresnel phase and sum beamforming system using a 6-phase or 12-phase system.
Figure 8A:
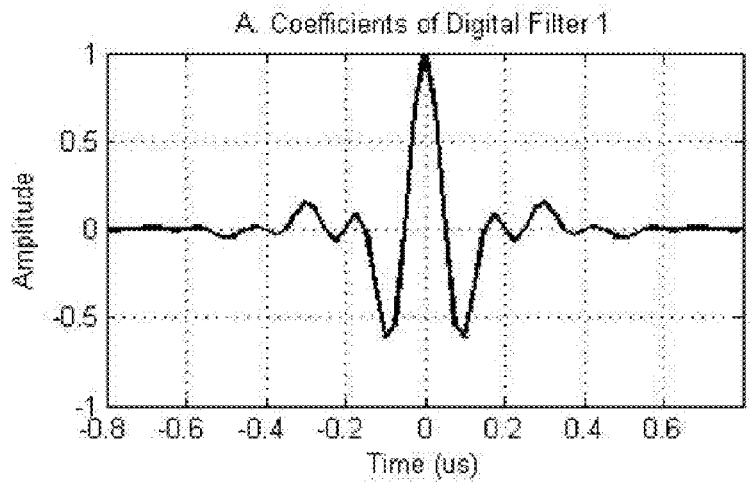
FIGS. 8A-I illustrates three band-pass filters in a 6-phase or 12-phase system.
Figure 8B:
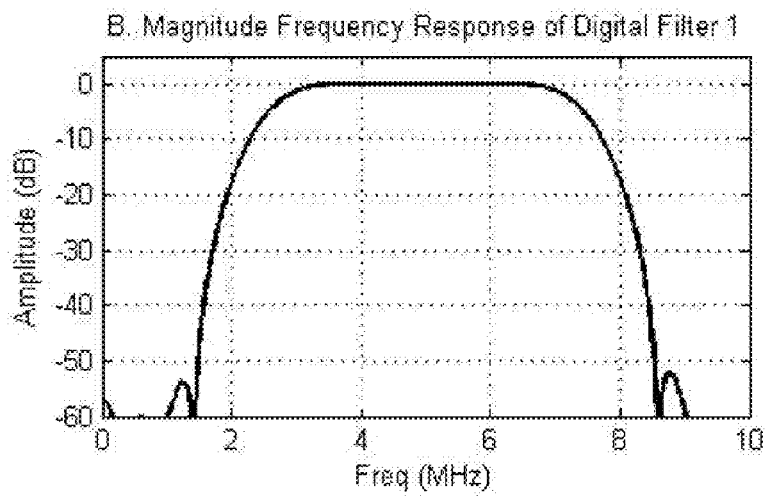
Figure 8C:
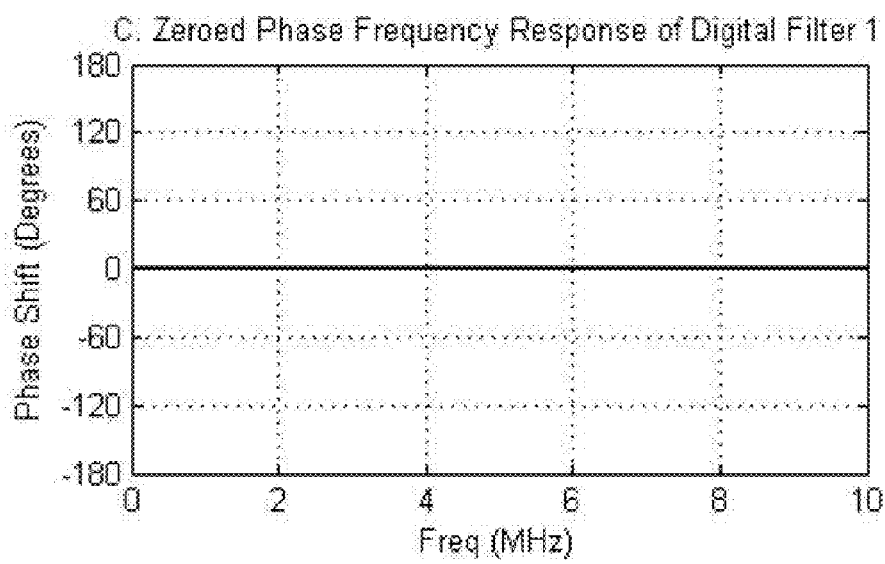
Figure 8D:
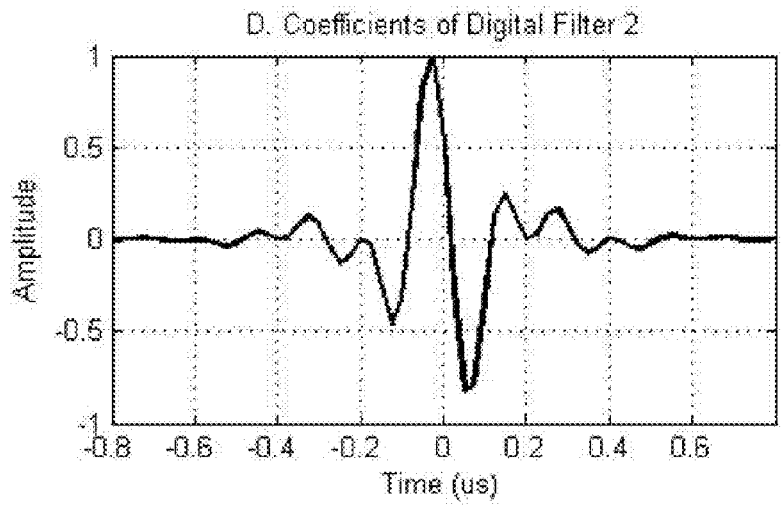
Figure 8E:
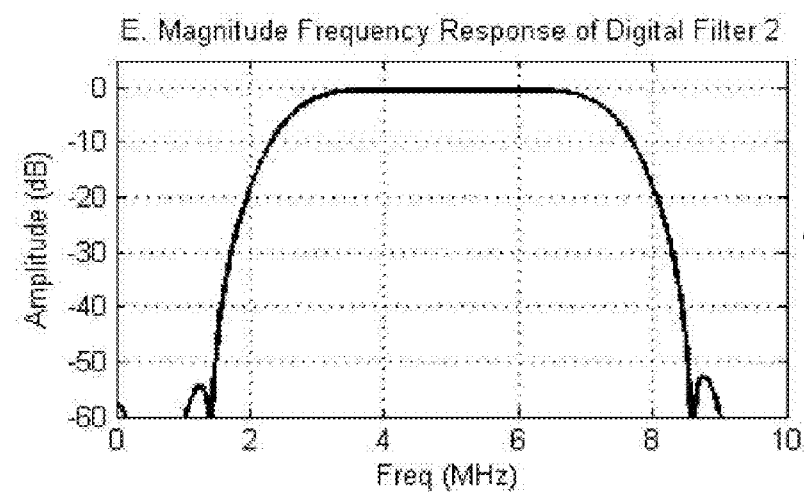
Figure 8F:
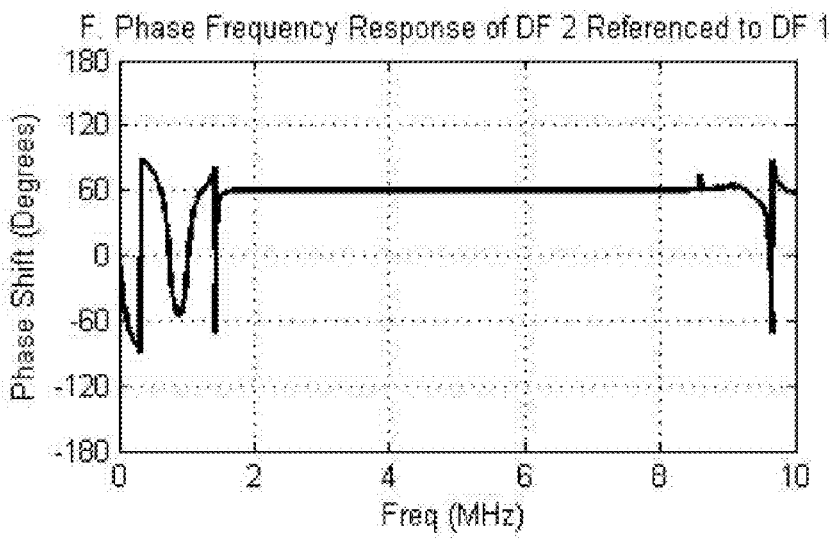
Figure 8G:
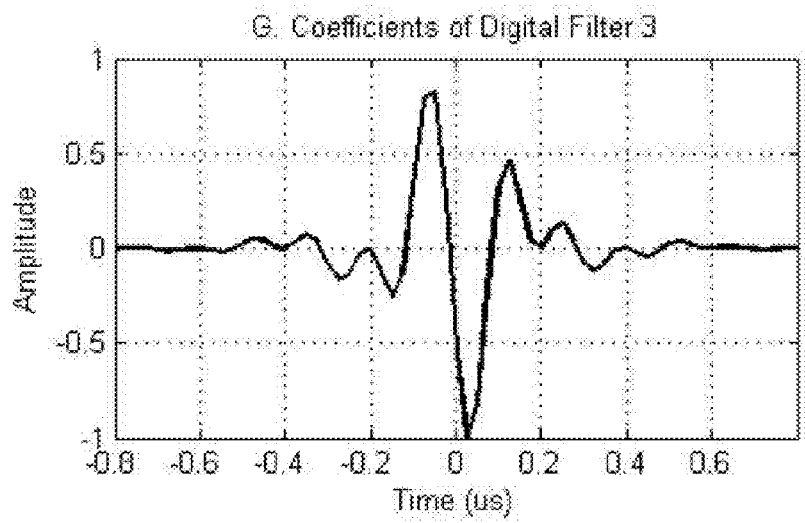
Figure 8H:
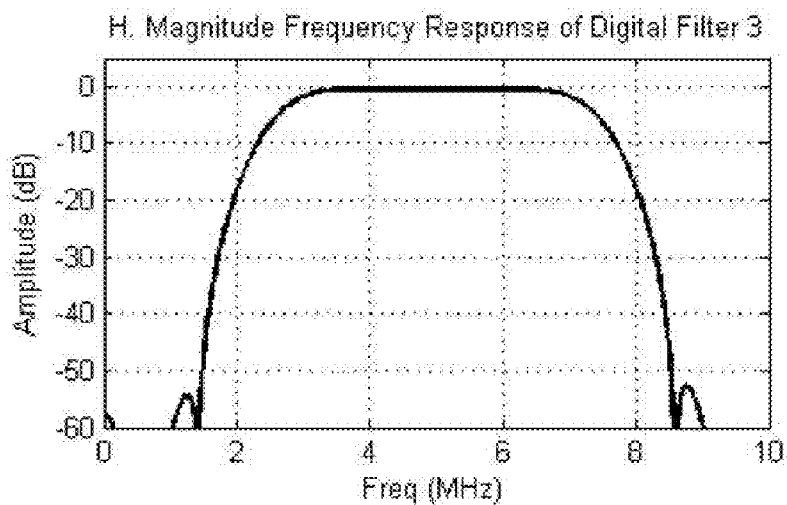
Figure 8I:
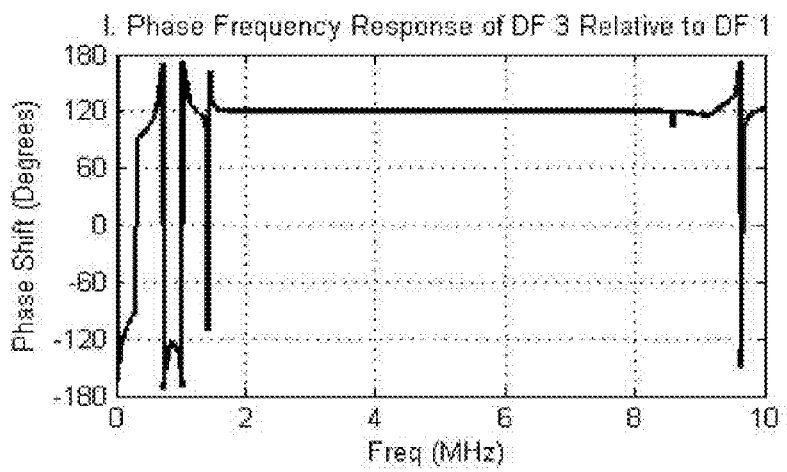

FIG. 7 illustrates a Fresnel phase and sum beamforming system using a 6-phase or 12-phase system. In this alternative configuration, there may be a set of 6 switches (6:1 multiplexer) for every element in the array. The system may be a modified version of what is illustrated in FIG. 3. Differential amplifiers may also be used. In FIG. 7, three differential amplifiers may be used.

This system may also use a similar set of inverting and non-inverting amplifiers, as previously described. After the amplifiers, the signals may be digitized by three A/D converters. Afterwards, the signal may go through either a 0°, 60°, or 120° phase shift. Because of the inverters, 180°, 240°, and 300° may also be applied. As in the previous system, if 2 switches are closed, additional 30°, 90°, 150°, 210°, 270°, and 330° phase shifts can also be applied, leading to a 12-phase system. A 6-phase or 12-phase system may have finer focusing capability than a 4-phase or 8-phase system, respectively. However, additional switchers, amplifiers, A/D converters, and digital filters may be needed.

FIGS. 8A-I illustrates coefficients of three digital filters which may be used in a 6-phase or 12-phase Frensel (phase and sum) beamformer. Applying a 60° phase shift can be done in the digital domain by creating a digital FIR filter from the weighted sum of a 0° FIR filter (I) and a 90° FIR filter (Q). The following formula for digital filter 2 (DF2) may be used:

$$DF2 = I/2 + \sqrt{3}Q/2$$

where F are the new filter coefficients. The filter coefficients, magnitude and phase frequency response are shown in the middle column. Applying a 120° phase shift can be done in the digital domain by creating a digital bandpass FIR filter from the weighted sum of a 0° FIR filter (I) and a 90° FIR filter (Q). FIR filter I may be the filter in FIG. 8A and FIR filter Q may be the filter in FIG. 8D. The following formula for digital filter 3 (DF3) may be used:

$$DF3 = -I/2 + \sqrt{3}Q/2$$

where F are the new filter coefficients. The filter coefficients, magnitude and phase frequency response are shown in the right column in FIG. 8.

These 60° and 120° phase shifts could be replaced by comparable time shifts similar to FIG. 4. Generally speaking, it may be possible to create an N-phase and a 2N-phase system by using different filters that provide N different phase shifts and/or time delays.

In the last variation, the beamformer may serve as a module within a larger beamformer composed of multiple modules. The beamformer may also serve as a module in a larger beamformer employing other methods of beamforming. In this context, the beamformer may be considered a sub-beamformer which beamforms a subset of the elements with N time delays or phase shifts. In this variation, multiple modules may be used to comprise the entire beamformer. The difference between the modules may be that each individual module receives a final time shift equal to an integer multiple of the period—the inverse of the ultrasound center frequency.

Figure 9:
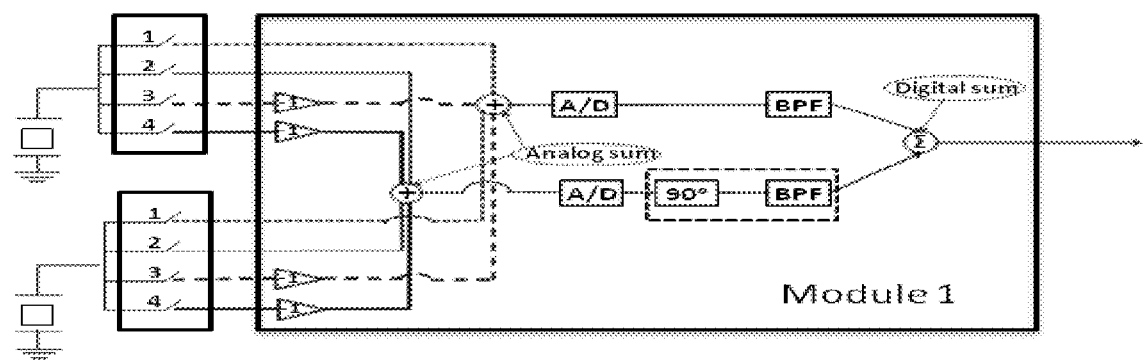
FIG. 9 illustrates a Fresnel-based beamformer in a modular form.

FIG. 9 illustrates a Fresnel-based beamformer in a modular form. The drawing is a replica of FIG. 3 with the addition of a box indicating the modular portion.

Figure 10:
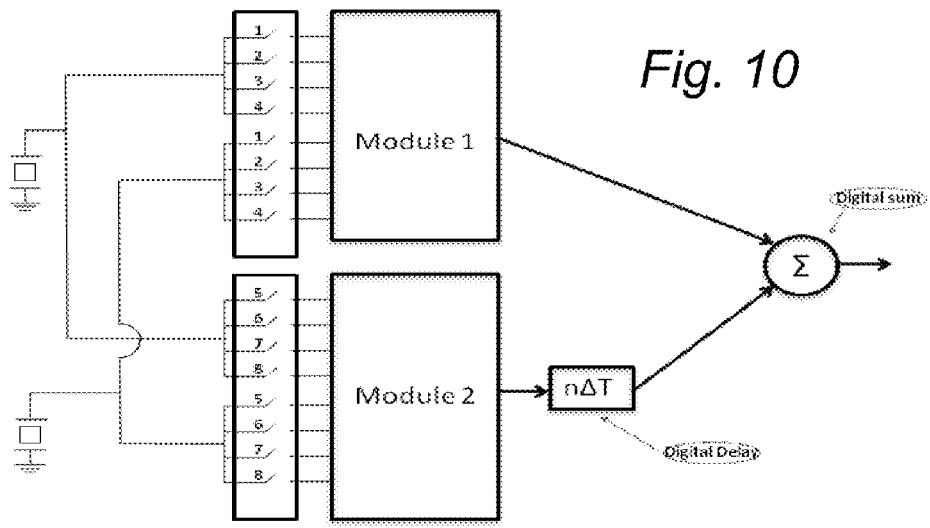
FIG. 10 illustrates a Fresnel-based beamformer with two modules.

FIG. 10 illustrates a Fresnel-based beamformer with two modules. In a beamformer which consists of more than one module, the output of the second module may be digitally delayed by an integer multiple period of the ultrasound center frequency. The output of Module 2 in FIG. 10 may be delayed by $n\Delta T$, where n is an integer and $\Delta T$ is the period. After the output of Module 2 is delayed, the result may be summed with the output of Module 1 to give the final output of the entire beamformer. Having two modules may double the total number of switches needed for each element.

Using Field II, computer simulations were performed to evaluate the performance of Fresnel beamforming compared to DAS beamforming in terms of lateral beamwidths, axial pulse length, and contrast. See J. A. Jensen and J. B. Svendsen, "Calculation of pressure fields from arbitrarily shaped, apodized, and excited ultrasound transducers,"*IEEE Trans. Ultrason., Ferroelectr., Freq. Control*, vol. 39, no. 2, pp. 262-267, 1992. The robustness of Fresnel beamforming was also examined by varying the signal bandwidth and the array f#. A temporal sampling rate of 200 MHz was used with a fixed transmit center frequency of 5 MHz.

The effect of signal bandwidth on the performance of Fresnel beamforming was investigated with a 5 MHz Gaussian pulse with −6 dB fractional signal bandwidths of 20%, 35%, 50%, 65%, and 80%. Since the receive side of the proposed Fresnel beamforming makes a narrowband assumption of the signal, the performance may degrade as bandwidth increases. The effect of f# on the performance of Fresnel beamformer was investigated by implementing f# of 1, 1.5, 2, 2.5, and 3. Using a DAS beamformer with a larger aperture may result in a better lateral resolution. However, the Fresnel beamformer may use time delays within one period or phase shifts which always range from 0° to 360°. This may result in a greater number of integer wavelength offsets as the aperture size increases. The signals from the edge elements can deteriorate the image quality by increasing the mainlobe width and sidelobe levels.

Field II Simulation Parameters

| PARAMETERS | VALUE |
|---|---|
| Center frequency | 5 MHz |
| Sampling frequency | 200 MHz |
| Azimuthal element pitch | 0.3 mm |
| Elevation element height | 5 mm |
| Sound speed | 1540 m/s |
| Transmit focus | 22 mm |

Full synthetic aperture RF data sets were collected and sampled at 40 MHz using an Ultrasonix Sonix RP ultrasound system (Ultrasonix Medical Corporation, Richmond, BC, Canada) with a 128 element, 300 μm pitch linear array. A 2-cycle 5 MHz transmit pulse was used in this experiment. Data from each channel were collected 32 times and averaged to minimize effects of electronic noise. The data sets were then beamformed using Matlab (The MathWorks, Inc. Natick, Mass.) with offline DAS, 8-phase Fresnel, and 4-phase Fresnel beamforming methods. The transmit focusing was fixed at 22 mm while the dynamic receiving focusing was updated every 0.1 mm. The image line spacing was 50 μm. The performance of Fresnel beamforming was evaluated in terms of spatial resolution and contrast-to-noise ratio. The effect of varying f# was also investigated with f#s of 1, 1.5, 2, 2.5, and 3.

A 0.4 mm diameter custom-made nylon wire target immersed at 20 mm depth in degassed water was imaged. The −6 dB lateral and axial target sizes were measured to serve as metrics for spatial resolution.

A full synthetic aperture RF data set of an ATS ultrasound phantom (Model 539, ATS Laboratories, Bridgeport, Conn.) containing a 3 mm diameter cylindrical anechoic cyst at 20 mm depth was collected and beamformed with offline DAS beamforming and the proposed Fresnel focusing techniques. Contrast-to-noise ratio (CNR) may be defined as the difference between the mean of the background and the cyst in dB divided by the standard deviation of the background in dB [15]:

$$CNR = \frac{\overline{S_t} - \overline{S_b}}{\sigma_b}$$

where $\overline{S_t}$ is the mean of the signal from the target (dB), $\overline{S_b}$ is the mean of the signal coming from the background (dB), and σb is the standard deviation of the background (dB)

FIGS. 11A-F illustrate lateral and axial beamplots simulated with Field II using 4-phase Fresnel and 8-phase Fresnel beamforming compared to DAS. The top row uses a signal bandwidth of 20%; the middle row of 50%; and the bottom row of 80%. F# is 2. From these figures, the lateral main lobes are found to be minimally affected by signal bandwidths. As signal bandwidth increases from 20% to 80%, there is little difference between lateral beamwidths using Fresnel beamforming and those using DAS. For instance, at 50% signal bandwidth, the −6 dB lateral beamwidths using 8-phase Fresnel and 4-phase Fresnel beamformers are 0.52 mm and 0.55 mm, which are about 2% and 8% higher compared to a beamwidth of 0.51 mm using DAS. However, a small increase in the differences between the lateral beamwidths using Fresnel beamforming and those using DAS was found as signal bandwidth increases. At lower bandwidth, the sidelobe levels with Fresnel beamforming are comparable to DAS (FIG. 11A). At 50% and 80% bandwidths, the peak sidelobe levels are 5.4 dB and 7.2 dB higher with Fresnel beamforming than with DAS beamforming (FIGS. 11B & C). For all bandwidths, the peak sidelobe with Fresnel focusing is closer to the mainlobe compared to DAS focusing.

Using 4-phase Fresnel beamforming, the axial pulse lengths are 0.86, 0.65, 0.59, 0.56, and 0.55 mm for signal bandwidths of 20%, 35%, 50%, 65%, and 80%, respectively. For the 8-phase Fresnel beamforming method, the axial pulse lengths are 0.86, 0.64, 0.58, 0.55, and 0.54 mm, respectively. While the 4-phase and 8-phase beamforming have pulse lengths comparable to each other, they are about 0.10 to 0.15 mm higher than the pulse lengths using DAS. For example, at 50% signal bandwidth, the −6 dB axial pulse lengths using 8-phase and 4-phase Fresnel beamformers are 0.59 mm and 0.58 mm, which are about 31% and 33% larger than −6 dB axial beamwidth of 0.45 mm using DAS, respectively. The differences in axial pulse lengths produced by Fresnel beamforming compared to DAS increase as the signal bandwidth increases. Fresnel beamforming also results in higher sidelobe levels at higher bandwidth.

Figure 12:
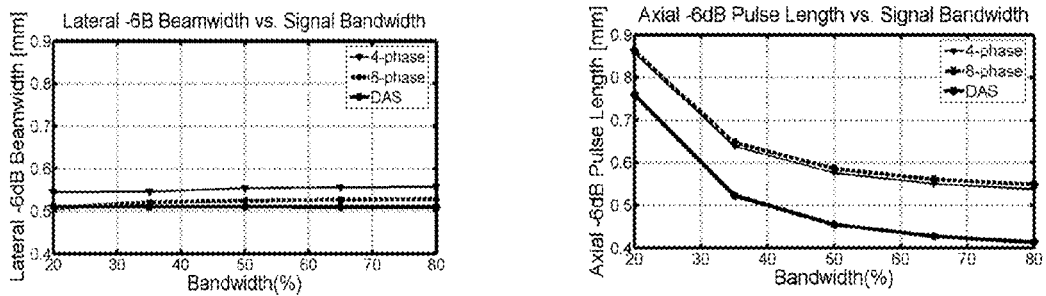
FIGS. 12A and 12B compares the effect of bandwidth x for DAS, 8-phase Fresnel, and 4-phase Fresnel beamformers.
Figure 13:
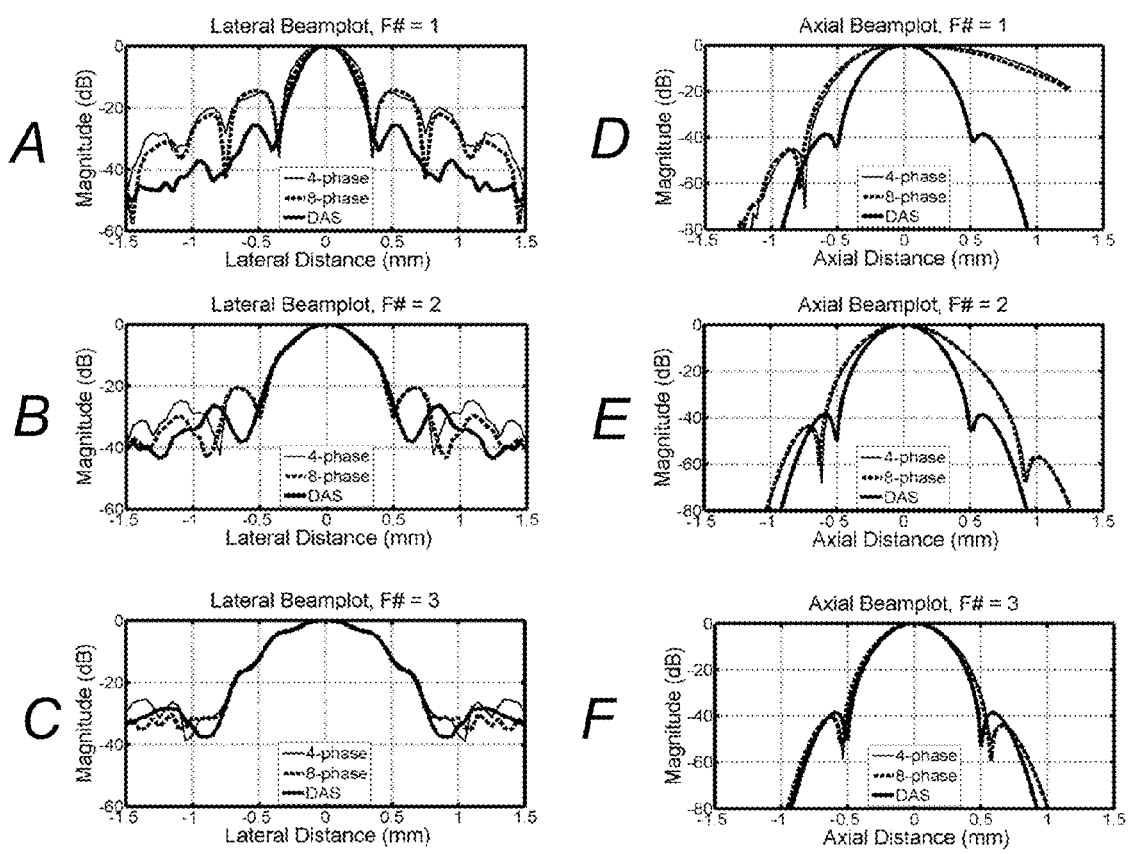
FIGS. 13A-13F illustrate the effects of f# on the performance of 4-phase and 8-phase Fresnel beamforming method compared to DAS.

FIGS. 12A and 12B compares the effect of bandwidth x for DAS, 8-phase Fresnel, and 4-phase Fresnel beamformers. FIG. 12A compares the effect on lateral bandwidths; FIG. 12B compares the effect on axial pulse lengths. The signal bandwidths are sampled at 20%, 35%, 50%, 65%, and 80%. F# is 2. These figures confirm the relationship between the performance of Fresnel beamforming and signal bandwidths: increasing signal bandwidth may have little effect on lateral beamwidth while reducing axial pulse length. These trends in performance of Fresnel beamforming compared to DAS may be explained by the violation of the narrowband assumption as the signal bandwidth increases.

Figure 6A:
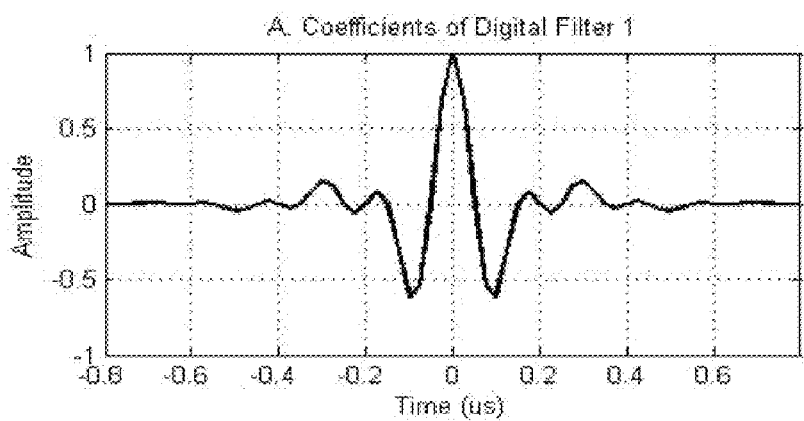
FIGS. 6A-F illustrates two band-pass filters (BPF) used in a 4-phase or 8-phase system.
Figure 6B:
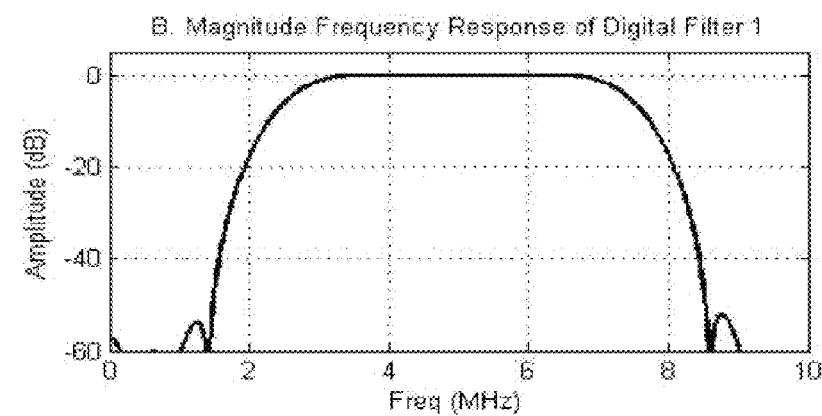
Figure 6C:
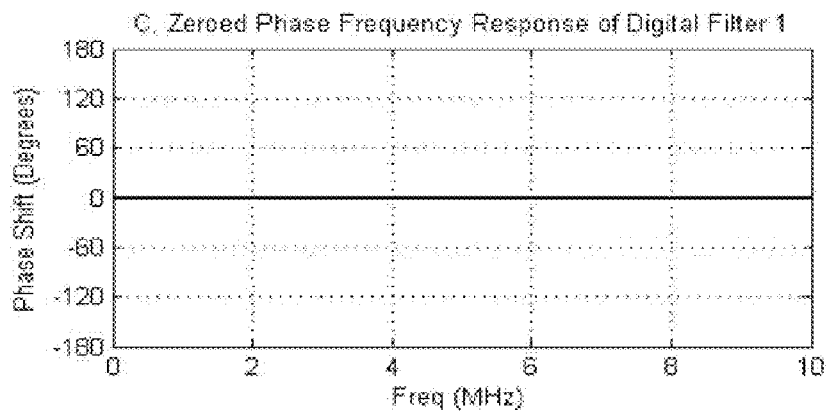
Figure 6D:
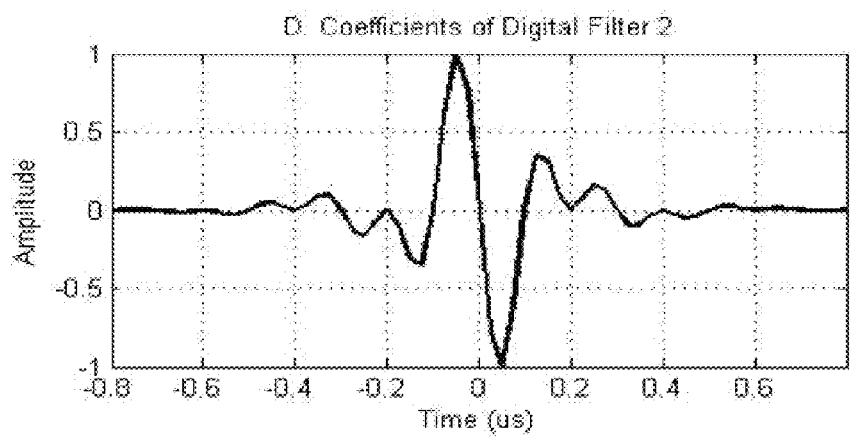
Figure 6E:
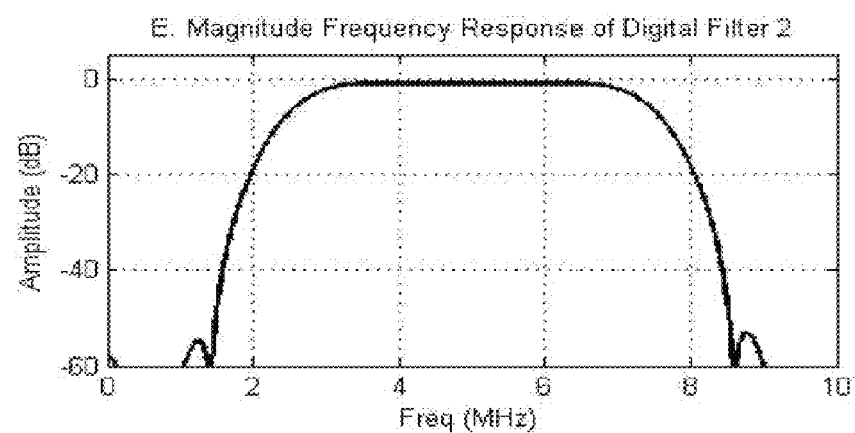
Figure 6F:
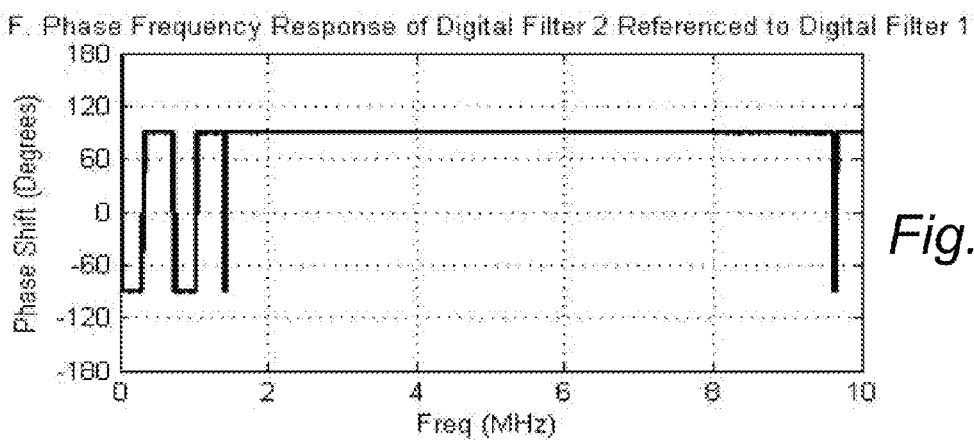

FIGS. 13A-13F illustrate the effects of f# on the performance of 4-phase and 8-phase Fresnel beamforming method compared to DAS. The f# is 1 in the top row, 2 in the middle, and 3 in the bottom row. Signal bandwidth is 50%. As f# incrementally increases from 1 to 3, the −6 dB lateral beamwidth also incrementally increases from 0.47 mm to 0.81 mm for 4-phase Fresnel beamforming method, from 0.40 mm to 0.81 mm for 8-phase Fresnel beamforming method, and from 0.34 mm to 0.80 mm for DAS beamforming. At f#=1, high sidelobes of −15 dB are seen for Fresnel beamforming, which are −11 dB higher than the sidelobe for DAS beamforming (FIG. 6a). These sidelobe magnitudes for Fresnel beamforming decrease to −20 dB for f#=2 (FIG. 6b). At f#=3, the sidelobe levels for Fresnel and DAS beamforming are quite comparable, which are about −30 dB. The opposite effect of f# on pulse length is seen on axial beamplots using Fresnel beamforming methods: increasing f# results in smaller axial pulse lengths (FIG. 6d-f). This effect on axial pulse length may only be seen with Fresnel beamforming methods, but not with traditional DAS beamforming. As the f# increases, the amount of focal error decreases. Therefore, the effect of wrapping phase shifts in Fresnel beamforming may be reduced as the number of integer wavelength offsets decrease. In fact, at f#=3, since the path length difference between the outer and center elements is about one wavelength, the delay profile for three beamforming methods may be the same, except that Fresnel beamformers uses phase shifts on the receive signals.

Figure 14:
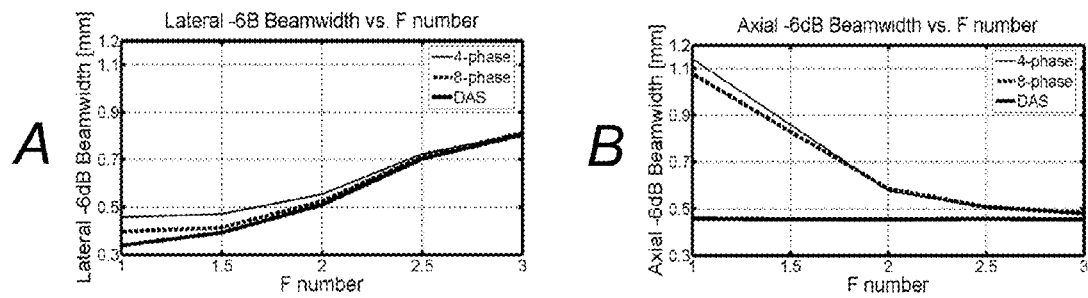
FIGS. 14A and 14B illustrate the effect of f# in 4-phase and 8-phase Fresnel beamforming method compared to DAS.

FIGS. 14A and 14B illustrate the effect of f# in 4-phase and 8-phase Fresnel beamforming method compared to DAS. FIG. 14A illustrate the effect on −6 dB lateral beamwidths; FIG. 14B on axial pulse lengths. Signal bandwidth is 50%. As can be seen from these figures, they approach those generated by traditional DAS beamformer as the f# approaches 3.

Figure 15:
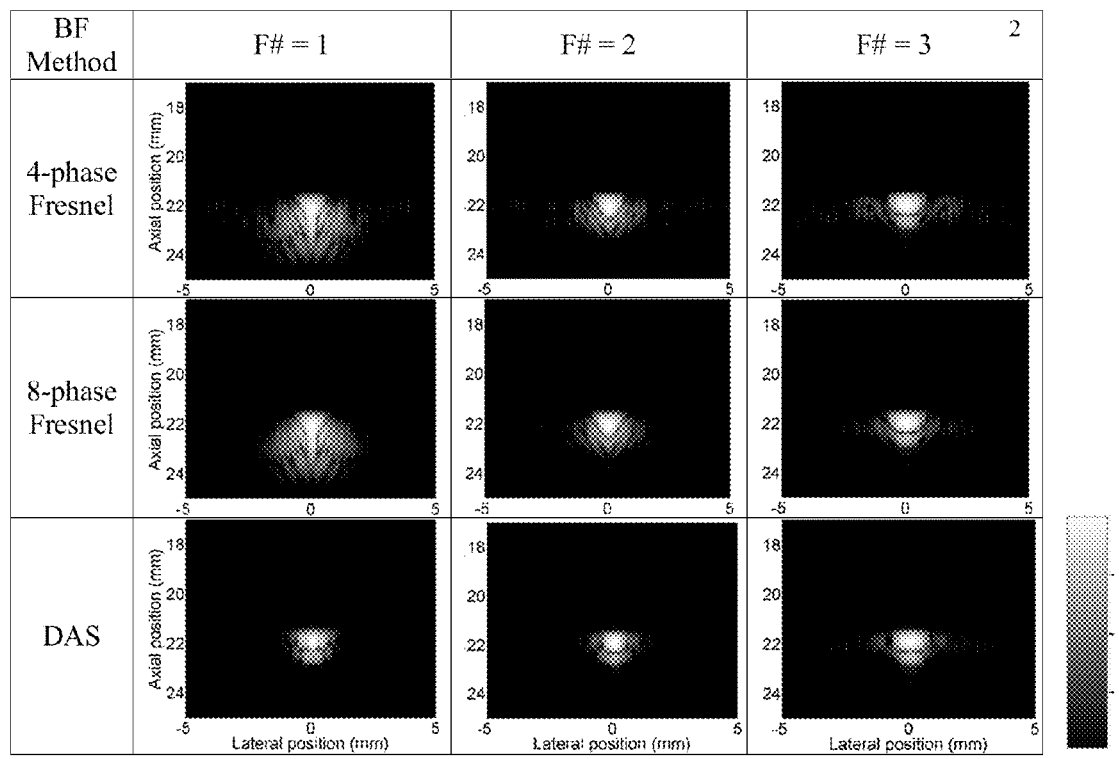
FIG. 15 illustrates experimental images of a custom-made nylon wire target immersed in degassed water using the three different beamforming approaches.

FIG. 15 illustrates experimental images of a custom-made nylon wire target immersed in degassed water using the three different beamforming approaches. The signal bandwidth is 50%. The relatively high sidelobe levels seen in simulated lateral beamplots using Fresnel beamforming can also be seen in the experimental images with dynamic range of 40 dB. As f# increases, −6 dB lateral wire size becomes larger while the noise caused by high sidelobe levels in Fresnel beamforming is reduced. At f#=3, the wire images beamformed by three different methods are very similar.

Figure 16:
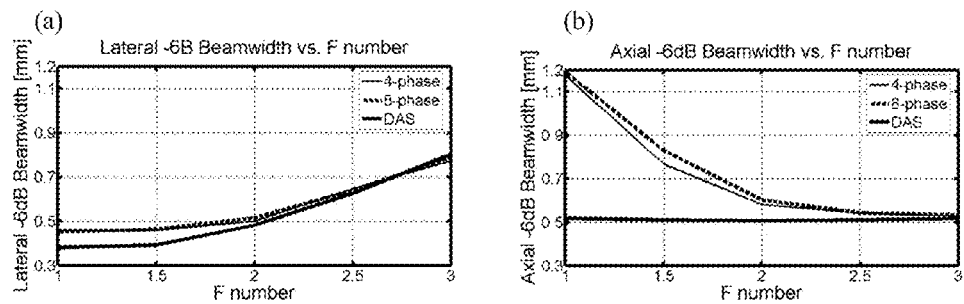
FIGS. 16A and 16B illustrate an experimental comparison of beamforming algorithms for DAS, 8-phase Fresnel, and 4-phase Fresnel beamformers as a function of f#.

FIGS. 16A and 16B illustrate an experimental comparison of beamforming algorithms for DAS, 8-phase Fresnel, and 4-phase Fresnel beamformers as a function of f#. FIG. 16A illustrates the effect on lateral beamwidth; FIG. 16B on axial pulse length. Signal bandwidth is 50% and the images are shown with 40 dB dynamic range. They show that the lateral and axial pulse lengths converge as f# approaches 3. This coincides with what is shown in FIG. 15. These trends are also in good agreement with those predicted by simulation shown in FIG. 14.

Figure 17:
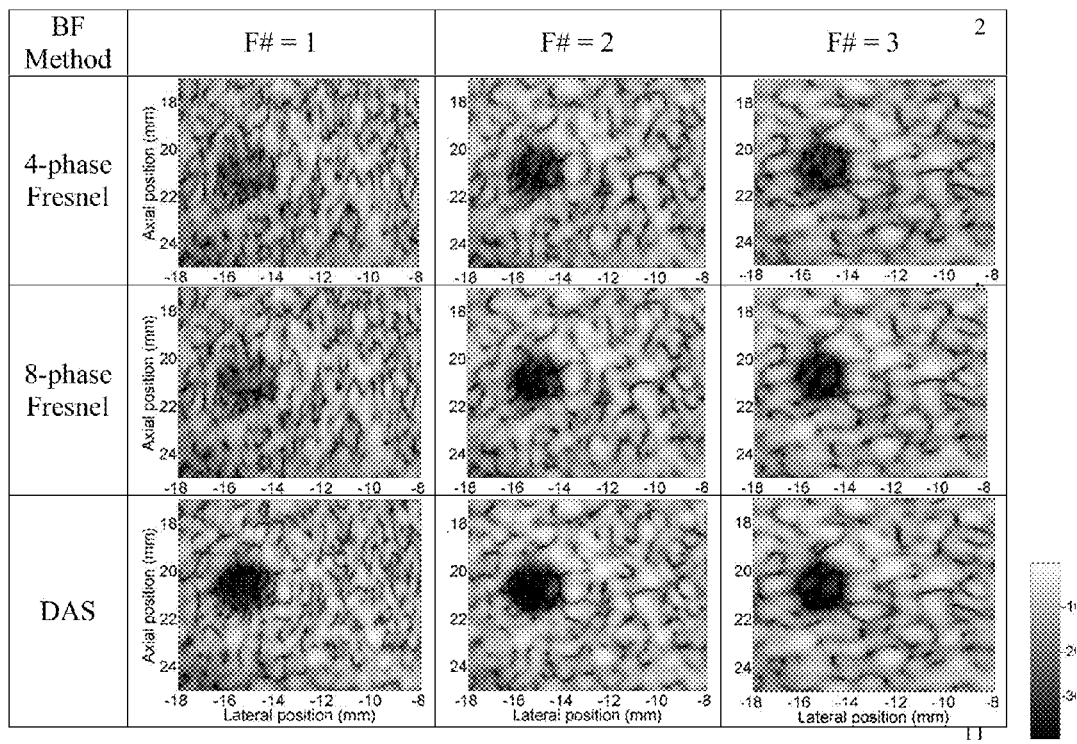
FIG. 17 illustrates experimental images of an ATS tissue-mimicking phantom containing anechoic cysts using the three different beamforming approaches.

FIG. 17 illustrates experimental images of an ATS tissue-mimicking phantom containing anechoic cysts using the three different beamforming approaches. The bandwidth is 50% and all images are shown on a 40 dB dynamic range. The transmit focus is always set to a 22 mm depth.

Figure 11:
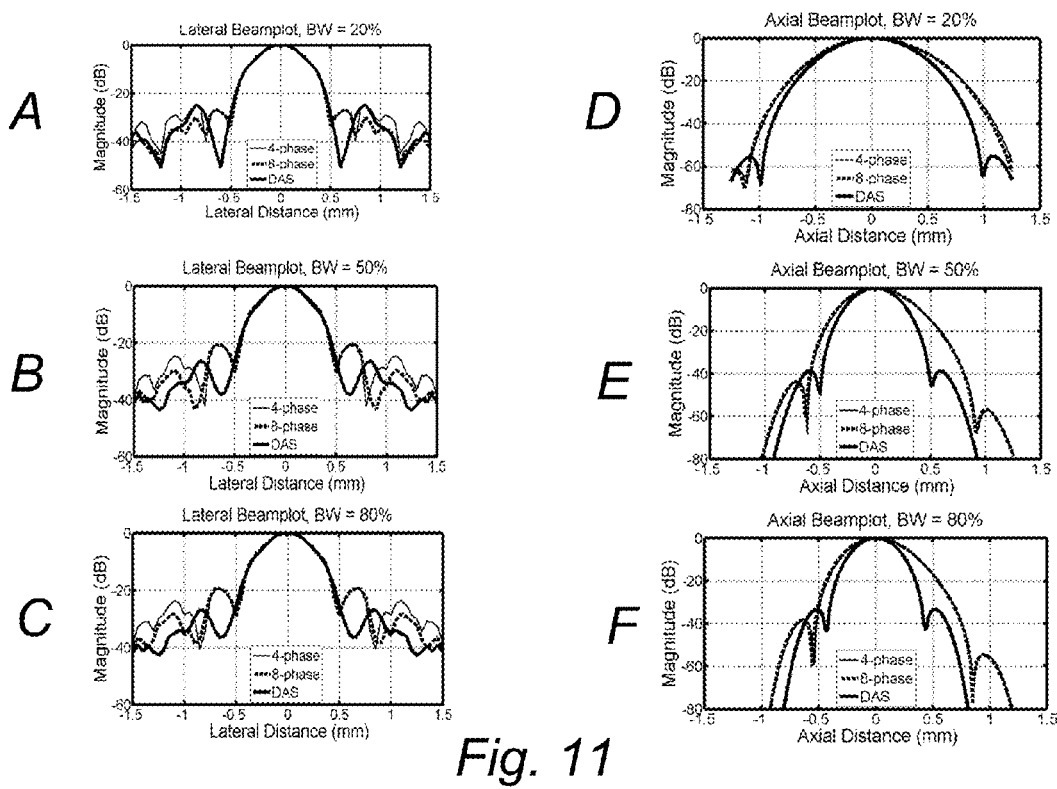
FIGS. 11A-F illustrate lateral and axial beamplots simulated with Field II using 4-phase Fresnel and 8-phase Fresnel beamforming compared to DAS.
Figure 18:
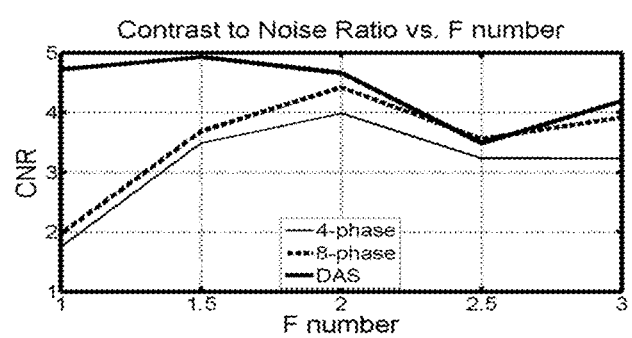
FIG. 18 illustrates an experimental comparison of DAS, 8-phase Fresnel, and 4-phase Fresnel beamforming algorithms in terms of contrast to noise ratio (CNR) with f#s of 1, 1.5, 2, 2.5, and 3.

FIG. 18 illustrates an experimental comparison of DAS, 8-phase Fresnel, and 4-phase Fresnel beamforming algorithms in terms of contrast to noise ratio (CNR) with f#s of 1, 1.5, 2, 2.5, and 3. Signal bandwidth is 50%. As shown in FIG. 11, the performance of Fresnel beamformers in terms of contrast-to-noise ratio is highest at an f# of 2. This can be explained by the compromise between the beamwidths and the integer wavelength offsets caused by Fresnel beamformers. Increasing f# increases the lateral beamwidth while reducing the integer wavelength offset. The CNR for the 3 mm diameter cyst images using traditional DAS, 8-phase Fresnel, and 4-phase Fresnel beamformers at f# of 2 are 4.66, 4.42, and 3.98, respectively.

The concept and performance evaluation of a Fresnel beamforming method for low-cost portable ultrasound system have now been discussed. An advantage of the proposed technology may be that a system with 4 to 8 transmit channels and 2 receive channels with a network of single-pole/single-throw switches can be used to focus an array with 64 to 128 elements. This beamforming technique may dramatically reduce the complexity, size, and cost of the system. The trade-off in image quality may also be considered.

The simulation and experimental results show that Fresnel beamforming image quality may be comparable to DAS beamforming in terms of spatial resolution and contrast-to-noise ratio under certain conditions, such as when f#=2 and 50% signal bandwidth. Fresnel beamforming may provide adequate image quality compared to DAS for different signal bandwidths. The lateral beamwidths using Fresnel beamforming are only 0.04 mm larger than those using DAS while the axial pulse lengths using Fresnel beamforming are about 0.10 mm to 0.15 mm larger than those using DAS while for a wide range of signal bandwidths. The results also show that f# has a significant effect on the performance of Fresnel beamforming. The optimal CNR using Fresnel beamforming occurs at f#=2, at which the CNRs using 8-phase and 4-phase Fresnel beamforming are about 5.1% and 14.6% lower than CNR using DAS, respectively. Despite the fact that 4-phase Fresnel beamforming uses half of the number of time delays and phase shifts in 8-phase Fresnel beamforming, the performance of these two methods are comparable. With larger signal bandwidths and smaller f#s, focal errors and the narrowband assumption in the Fresnel systems may strongly degrade image quality.

The Fresnel beamforming technique may be a suitable alternative for low-cost portable ultrasound systems due to the reduced channel count. These portable ultrasounds may be extremely helpful for certain applications where readiness and portability are critical, such as in an emergency room or battle field.

The components, steps, features, objects, benefits and advantages which have been discussed are merely illustrative. None of them, nor the discussions relating to them, are intended to limit the scope of protection in any way. Numerous other embodiments are also contemplated. These include embodiments which have fewer, additional, and/or different components, steps, features, objects, benefits and advantages. These also include embodiments in which the components and/or steps are arranged and/or ordered differently.

Unless otherwise stated, all measurements, values, ratings, positions, magnitudes, sizes, and other specifications which are set forth in this specification, including in the claims which follow, are approximate, not exact. They are intended to have a reasonable range which is consistent with the functions to which they relate and with what is customary in the art to which they pertain.

All articles, patents, patent applications, and other publications which have been cited in this disclosure are hereby incorporated herein by reference.

The phrase "means for" when used in a claim is intended to and should be interpreted to embrace the corresponding structures and materials which have been described and their equivalents. Similarly, the phrase "step for" when used in a claim is intended to and should be interpreted to embrace the corresponding acts which have been described and their equivalents. The absence of these phrases in a claim mean that the claim is not intended to and should not be interpreted to be limited to any of the corresponding structures, materials, or acts or to their equivalents.

Nothing which has been stated or illustrated is intended or should be interpreted to cause a dedication of any component, step, feature, object, benefit, advantage, or equivalent to the public, regardless of whether it is recited in the claims.

The scope of protection is limited solely by the claims which now follow. That scope is intended and should be interpreted to be as broad as is consistent with the ordinary meaning of the language which is used in the claims when interpreted in light of this specification and the prosecution history which follows and to encompass all structural and functional equivalents.

The invention claimed is:

1. An ultrasonic beamformer for substantially compensating for differences in distances between a number of ultrasonic elements in an ultrasonic transducer array and a location remote from the ultrasonic transducer array from which a reflected broadband pulse is received by each of the ultrasonic elements, the ultrasonic beamformer comprising:
   for each of the ultrasonic elements, an input signal line configured to carry the broadband pulse from the ultrasonic element;
   a number of signal shifters that is less than the number of transducer elements, each signal shifter being configured to shift the broadband pulse in a way that is different from the way the other signal shifters are configured to shift a broadband pulse, at least one of the signal shifters being an inverter;
   for each of the input signal lines, a receiving multiplexer configured to electrically connect the broadband pulse received on the input signal line to a selected one of the signal shifters, the selected one being based on a control signal;
   a summer at the input of each signal shifter configured to sum the broadband pulses that are directed to the signal shifter by the multiplexers; and
   a multiplexer controller configured to generate the control signal for each of the multiplexers in a fashion that causes the ultrasonic beamformer to substantially compensate for the differences in the distances.

2. The ultrasonic beamformer of claim 1 wherein each of the signal shifters is a phase shifter which is configured to provide a phase shift that differs from the phase shift provided by each of the other phase shifters by no more than 360 degrees.

3. The ultrasonic beamformer of claim 2 wherein the phase shifts that are provided by the phase shifters are spaced apart by substantially equal amounts.

4. The ultrasonic beamformer of claim 3 wherein there are at least four phase shifters that provide a phase shift of substantially 0, 90, 180, and 270 degrees, respectively.

5. The ultrasonic beamformer of claim 4 further comprising:
   a first summer configured to sum the output of the phase shifters which provide a substantially 0 and 180 degree phase shift;
   a second summer configured to sum the output of the phase shifters which provide a substantially 0 and 180 degree phase shift; and
   a phase shifter configured to shift the output of the second summer by 90 degrees, thereby producing the 90 and 270 degree phase shifts referred to in claim 4.

6. The ultrasonic beamformer of claim 5 wherein one of the summers sums in the analog domain and the other summer sums in the digital domain.

7. The ultrasonic beamformer of claim 4 wherein the phase shifters which shift by 90 and 270 degrees are each part of a bandpass filter.

8. The ultrasonic beamformer of claim 4 wherein there are at least four additional phase shifters that provide a phase shift of substantially 45, 135, 225, and 315 degrees, respectively.

9. The ultrasonic beamformer of claim 3 further comprising a differential amplifier configured to function as one of the phase shifters providing a substantially 0 degree phase shift, another of the phase shifters providing a substantially 180 degree phase shift, and to sum the result.

10. The ultrasonic beamformer of claim 3 wherein one of the phase shifters provides a substantially 0 degree phase shift, another provides a substantially 180 degree phase shift, and further comprising a summer configured to sum the outputs of the 0 and 180 degree phase shifters, and a delay element configured to delay the output of the summer by substantially a quarter period of the center frequency of the broadband pulses.

11. The ultrasonic beamformer of claim 3 wherein there are at least six phase shifters that provide a phase shift of substantially 0, 60, 120, 180, 240, and 300 degrees, respectively.

12. The ultrasonic beamformer of claim 11 wherein there are at least six additional phase shifters that provide a phase shift of substantially 30, 90, 150, 210, 270, and 330 degrees, respectively.

13. The ultrasonic beamformer of claim 2 wherein:
at least one of the phase shifters shifts in the analog domain; and
at least one of the phase shifters shifts in the digital domain.

14. The ultrasonic beamformer of claim 1 further comprising a number of analog-to-digital converters that is no more than ⅛ the number of ultrasonic elements, each configured to convert one of the broadband pulses from analog to digital format.

15. The ultrasonic beamformer of claim 1 wherein the ultrasonic beamformer is also for causing a transmitting ultrasonic transducer array having an array of transmitting ultrasonic elements to deliver an ultrasonic beam substantially focused at the location remote from the transmitting ultrasonic transducer array, the ultrasonic beamformer further comprising:
for each of the transmitting ultrasonic elements, an output signal line configured to carry a broadband pulse to the transmitting ultrasonic element;
a number of pulse transmitters that is substantially less than the number of transmitting ultrasonic elements, each pulse transmitter being configured to generate a broadband pulse different from the broadband pulse generated by each of the other pulse transmitters;
for each of the output signal lines, a transmitting multiplexer configured to electrically connect the output signal line to the broadband pulse that is generated by a selected one of the pulse transmitters, the selected one being based on a control signal; and
a transmitting multiplexer controller configured to generate the control signal for each of the transmitting multiplexers in a fashion that causes an ultrasonic beam to be substantially focused at the location remote from the ultrasonic transducer array.

16. The ultrasonic beamformer of claim 15 wherein the broadband pulses that are generated by the pulse transmitters have substantially a same center frequency and are separated in time from each other by no more than the period of the center frequency.

17. The ultrasonic beamformer of claim 15 wherein the broadband pulses that are generated by the pulse transmitters are shifted in phase with respect to one another.

18. The ultrasonic beamformer of claim 15 wherein the receiving ultrasonic transducer array, the receiving multiplexers, the receiving ultrasonic elements, and the input signal lines are, respectively, the same as the transmitting ultrasonic transducer array, the transmitting multiplexers, the transmitting ultrasonic elements, and the output signal lines.

19. The ultrasonic beamformer of claim 1 wherein the signal shifters, the multiplexers, and the multiplex controller collectively comprise a first module of the ultrasonic beamformer, and further comprising:
one or more additional modules, each additional module:
also containing signal shifters, multiplexers, and a multiplex controller as described in claim 1, but otherwise being different from the first module and each of the other modules; and
configured to deliver an output which is delayed in time from the output of the first module by an integer multiple of the period of the center frequency of the broadband pulses, the integer multiple for each additional module being different from the integer multiple for the other additional modules; and
a summer configured to sum the outputs of each of the modules.

20. The ultrasonic beamformer of claim 1 wherein at least one multiplexer is configured to controllably direct an input to the multiplexer to two different signal shifters simultaneously.

21. The ultrasonic beamformer of claim 1 wherein the multiplexer controller is configured to cause each multiplexer to select a signal shifter based on a geometric time delay associated with the ultrasonic element associated with the multiplexer and the period of the ultrasound signal.

22. The ultrasonic beamformer of claim 21 wherein the multiplexer controller is configured to select phase shifters also based on a depth or time at which echoes arrive at the array.

23. An ultrasonic beamformer for causing an ultrasonic transducer array having an array of transmitting ultrasonic elements to deliver an ultrasonic beam substantially focused at a location remote from the ultrasonic transducer array, the ultrasonic beamformer comprising:
for each of the ultrasonic elements, an output signal line configured to carry a broadband pulse to the transmitting ultrasonic element;
a number of pulse transmitters that is less than the number of ultrasonic elements, each pulse transmitter being configured to generate a broadband pulse different from the broadband pulse generated by each of the other pulse transmitters;
for each of the output signal lines, a multiplexer configured to electrically connect the output signal line to the broadband pulse that is generated by a selected one of the pulse transmitters, the selected one being based on a control signal; and
a multiplexer controller configured to generate the control signal for each of the multiplexers in a fashion that causes the ultrasonic beam to be substantially focused at the location remote from the ultrasonic transducer array.

24. The ultrasonic beamformer of claim 23 wherein the broadband pulses that are generated by the pulse transmitters have substantially a same center frequency and are separated in time from each other by no more than the period of the center frequency.

25. The ultrasonic beamformer of claim 23 wherein the broadband pulses that are generated by the pulse transmitters are shifted in phase with respect to one another.

26. The ultrasonic beamformer of claim 23 wherein the number of pulse transmitters is no more than ⅛ the number of ultrasonic elements.

27. The ultrasonic beamformer of claim 23 wherein the pulse transmitters, the multiplexers, and the multiplex controller collectively comprise a first module of the ultrasonic beamformer, and further comprising:
one or more additional modules, each additional module:
also containing pulse transmitters, multiplexers, and a multiplex controller as described in claim 23, but otherwise being different from the first module and each of the other modules; and
configured to deliver an output which is delayed in time from an output of the first module by an integer multiple of the period of the center frequency of the broadband pulses, the integer multiple for each additional module being different from the integer multiple for the other additional modules.

28. The ultrasonic beamformer of claim 23 wherein the multiplexer controller is configured to cause each multiplexer to select a signal shifter based on a geometric time delay associated with the ultrasonic element associated with the multiplexer and the period of the ultrasound signal.

29. An ultrasonic beamformer for substantially compensating for differences in distances between a number of ultrasonic elements in an ultrasonic transducer array and a location remote from the ultrasonic transducer array from which a reflected broadband pulse is received by each of the ultrasonic elements, the ultrasonic beamformer comprising:

for each of the ultrasonic elements, an input signal line configured to carry the broadband pulse from the ultrasonic element;

a number of signal shifters that is less than the number of transducer elements, each signal shifter being configured to shift the broadband pulse in a way that is different from the way the other signal shifters are configured to shift a broadband pulse, at least one of the signal shifters being a differential amplifier;

for each of the input signal lines, a receiving multiplexer configured to electrically connect the broadband pulse received on the input signal line to a selected one of the signal shifters, the selected one being based on a control signal;

a summer at the input of each signal shifter configured to sum the broadband pulses that are directed to the signal shifter by the multiplexers, at least one of the summers being the differential amplifier; and a multiplexer controller configured to generate the control signal for each of the multiplexers in a fashion that causes the ultrasonic beamformer to substantially compensate for the differences in the distances.

* * * * *